`US009587045B2`

United States Patent
Kropf et al.

(10) Patent No.: US 9,587,045 B2
(45) Date of Patent: Mar. 7, 2017

(54) WASHING AND CLEANING AGENT HAVING IMPROVED PERFORMANCE

(71) Applicant: Henkel AG & Co. KGaA, Duesseldorf (DE)

(72) Inventors: Christian Kropf, Hilden (DE); Benoit Luneau, Ratingen (DE); Siglinde Erpenbach, Monheim (DE); Andre Hatzelt, Duesseldorf (DE); Thomas Weber, Dormagen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 14/199,670

(22) Filed: Mar. 6, 2014

(65) Prior Publication Data

US 2014/0187465 A1 Jul. 3, 2014

Related U.S. Application Data

(63) Continuation of application No. PCT/EP2012/066169, filed on Aug. 20, 2012.

(30) Foreign Application Priority Data

Sep. 8, 2011 (DE) .................. 10 2011 082 377

(51) Int. Cl.

| | | |
|---|---|---|
| C11D 3/26 | (2006.01) | |
| C11D 3/32 | (2006.01) | |
| C11D 7/32 | (2006.01) | |
| C08F 22/38 | (2006.01) | |
| C11D 11/00 | (2006.01) | |
| C11D 3/37 | (2006.01) | |

(52) U.S. Cl.
CPC .............. *C08F 22/38* (2013.01); *C11D 3/26* (2013.01); *C11D 3/3719* (2013.01); *C11D 3/3723* (2013.01); *C11D 3/3769* (2013.01); *C11D 11/0017* (2013.01)

(58) Field of Classification Search
CPC ....... C11D 3/26; C11D 3/3769; C11D 7/3263; C11D 7/3723; C11D 11/0017
USPC .............................. 510/333, 501, 502; 8/137
See application file for complete search history.

(56) References Cited

U.S. PATENT DOCUMENTS

| | | |
|---|---|---|
| 4,874,539 A | 10/1989 | Huffman |
| 5,733,342 A | 3/1998 | Greindl et al. |

FOREIGN PATENT DOCUMENTS

| | | |
|---|---|---|
| DE | 4427630 A1 | 2/1996 |
| EP | 0384911 A2 | 8/1990 |
| EP | 0384912 A2 | 8/1990 |
| EP | 0388389 A2 | 9/1990 |
| WO | 86/00891 A1 | 2/1986 |
| WO | 2008/101909 A1 | 8/2008 |
| WO | 2010/069957 A1 | 6/2010 |

OTHER PUBLICATIONS

English Language Machine Translation of DE 4427630.*
PCT International Search Report (PCT/EP2012/066169) dated Nov. 23, 2012.

* cited by examiner

*Primary Examiner* — Gregory R Delcotto
(74) *Attorney, Agent, or Firm* — Thomas G. Krivulka

(57) ABSTRACT

The present invention relates to the use of polyamidohydroxamates in washing and cleaning agents to improve cleaning performance, in particular with regard to stains containing polymerizable dyes.

2 Claims, No Drawings

WASHING AND CLEANING AGENT HAVING IMPROVED PERFORMANCE

FIELD OF THE INVENTION

The present invention generally relates to the use of polyamidohydroxamates in washing and cleaning agents to improve cleaning performance, in particular with regard to stains containing polymerizable dyes.

BACKGROUND OF THE INVENTION

While formulating powdered washing and cleaning agents containing bleaching agents no longer presents any problems nowadays, formulating stable, liquid washing and cleaning agents containing bleaching agents is still problematic. Accordingly, the customary absence of bleaching agent in liquid washing and cleaning agents means that stains that would normally be removed, in particular because of the bleach content, are frequently only inadequately removed. A similar problem exists with bleach-free color washing agents from which the bleaching agent is omitted so as to protect the dyes in the textiles and to prevent them from fading. In the absence of a bleaching agent there is the additional difficulty that rather than removing the stains, which would normally be removed by the bleaching agent, the washing process by contrast frequently even intensifies the stain and/or makes it more difficult to remove, a fact that is attributable not least to initiated chemical reactions consisting for example in the polymerization of certain dyes contained in the stains.

Such problems occur in particular with stains containing polymerizable dyes. These are mostly red- to blue-colored stains. The polymerizable substances are above all polyphenolic dyes, preferably flavonoids, in particular from the class of anthocyanidins or anthocyanins. The stains can be caused in particular by food products or drinks containing corresponding dyes. In particular, the stains can be marks from fruit or vegetables or red wine marks containing red and/or blue dyes, in particular polyphenolic dyes, above all those from the class of anthocyanidins or anthocyanins.

The international patent application WO 2010/069957 A1 describes washing agent compositions containing hydroxamic acids or hydroxamates, which can bear various residues such as substituted alkyl, alkenyl or alkyl ether groups at the N atom and at the carbonyl C atom.

The international patent application WO 2008/101909 describes the use of metal complexes with siderophore ligands having hydroxamic acid units as bleach catalysts for washing and cleaning agents.

Bleach-free washing agent compositions having a sequestering action and containing hydroxamic acids or hydroxamates with $C_{5-21}$ alkyl chains at the carbonyl C atom and hydrogen or $C_{1-6}$ alkyl chains at the N atom are known from the European patent application EP 0 388 389 A2.

The European patent application EP 0 384 912 A2 describes the use of hydroxamates as stabilizers for peroxidic bleaching agents in washing agents.

The use of branched hydroxamates bearing COOH substituents as builders and bleach stabilizers in washing and cleaning agents is known from the European patent application EP 0 695 289 B1.

Polyamidohydroxamates are known as iron chelators. Thus the international patent application WO 86/00891 A1 describes polymeric hydroxamic acids of the general formula

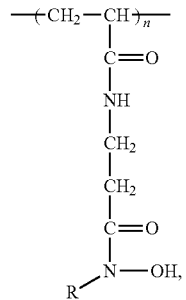

in which R denotes hydrogen or low alkyl and n denotes a number from 40 to 300, and the suitability thereof for treating medical disorders in humans and animals that are attributable to raised iron levels.

Surprisingly it has been found that the cleaning performance of the washing or cleaning agent in respect of stains containing polymerizable substances can be markedly improved through the use of polyamidohydroxamates.

Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Use of polyamidohydroxamates in washing and cleaning agents to improve cleaning performance.

A washing or cleaning agent characterized in that it contains polyamidohydroxamate.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The present invention firstly provides the use of polyamidohydroxamates in washing and cleaning agents to improve cleaning performance, in particular for the improved removal of stains containing polymerizable substances, in particular polymerizable dyes, wherein the polymerizable dyes are preferably polyphenolic dyes, in particular flavonoids, above all anthocyanidins or anthocyanins or oligomers of said compounds. These are preferably red- to blue-colored stains, in particular marks from fruit or vegetables or red wine marks containing red- to blue-colored dyes, in particular also stains from food products or drinks containing corresponding dyes.

"Red- to blue-colored stains" are understood to be dyes which can have a color from the red to blue color spectrum. Thus in addition to stains in the colors red or blue they include in particular stains in intermediate colors, in particular violet, lilac, purple or pink, in other words stains having a red, violet, lilac, purple, pink or blue tone, without themselves being essentially consisting entirely of that color. The specified colors can in particular also be light or dark, i.e. possible colors include in particular light and dark red and light and dark blue. The stains to be removed according to the invention can be caused in particular by cherries, red grapes, pomegranate, chokeberry, plums, sea buckthorn, acai or berries, in particular by redcurrants or blackcurrants, elderberries, blackberries, raspberries, blueberries, lingonberries, cowberries, strawberries or bilberries, red cabbage, blood orange, eggplant, black carrot, red- or blue-fleshed potatoes or red onions.

The polyamidohydroxamate can be any polymeric compound having amidohydroxamate units.

It is preferably formally obtainable by radical polymerization of one of the monomers $$CH_2=CR^1-C(O)-N(OH)-R^2; \qquad \text{a.)}$$

$$CH_2=CR^1-X-C(O)-N(OH)-R^2; \qquad \text{b.)}$$

$$CH_2=CR^1-C(O)-N(R^3)\text{-}A\text{-}C(O)-N(OH)-R^2; \qquad \text{c.)}$$

$$CH_2=CR^1-C(O)-N(A\text{-}C(O)-N(OH)-R^2)_2; \text{ and} \qquad \text{d.)}$$

$$CH_2=CR^1-C(O)-N(R^3)\text{-}A\text{-}CR^{41}(B-C(O)-N(OH)-R^2)_2; \qquad \text{e.)}$$

in which $R^1$ denotes hydrogen or an alkyl group having 1 to 3 C atoms, $R^2$, $R^3$ and $R^4$ independently of one another denote hydrogen or an alkyl, aryl, alkylaryl or arylalkyl group having 1 to 20 C atoms, in particular 1 to 12 C atoms, X denotes O-A, O—C(O)-A or C(O)—O-A, and A and B independently of one another denote an alkylene group having 1 to 12 C atoms, in particular 1 to 6 C atoms, or mixtures of two or more of the specified monomers, wherein in practice corresponding amidoamides can be used for polymerization and then the terminal amide groups converted into hydroxamic acid groups by polymer-analogous reaction with optionally N—$R^2$-substituted hydroxylamine. The polyamidohydroxamate can additionally contain further ethylenically unsaturated monomers having no amidohydroxamate functionality, such as for example styrene, hydroxystyrene, methylstyrene, maleic acid, vinyl acetate, acrylic acid, methacrylic acid, acrylamide or methacrylamide and mixtures of at least two of said monomers. If the polyamidohydroxamate is composed of a plurality of different monomers, the copolymerization can be performed as a random or block reaction. It can also be a comb polymer containing amidohydroxamate residues in the backbone and/or in the side chain. Preferred monomers are methacrylic acid, acrylic acid, methacrylamide and acrylamide.

The polyamidohydroxamate preferably has an average molar mass in the range from 1000 g/mol to 500,000 g/mol, in particular from 1000 g/mol to 100,000 g/mol. The average molar masses specified here and below, optionally for other polymers, are weight-average molar masses $M_w$, which can be determined in principle by gel permeation chromatography using an RI detector, the measurement conveniently being performed against an external standard.

Polyamidohydroxamate is preferably used in washing or cleaning agents in an amount from 0.001 wt. % to 10 wt. %, in particular in an amount from 0.01 wt. % to 5 wt. %, more preferably in an amount from 0.05 wt. % to 2 wt. %, wherein here and below the "wt. %" figures refer in each case to the weight of the total washing or cleaning agent.

The washing or cleaning agent can be present in any presentation form that is established according to the prior art and/or any convenient presentation form. These include for example solid, powdered, liquid, gel or paste presentation forms, optionally also consisting of a plurality of phases, compressed or not compressed; they also include, for example: extrudates, granules, tablets or pouches, packed both in bulk containers and in portions.

In a preferred embodiment the use according to the invention occurs in a washing and cleaning agent containing no bleaching agent. This is understood to mean that the agent according to the invention contains no bleaching agent in the narrower sense, in other words hydrogen peroxide or substances yielding hydrogen peroxide; it preferably also contains no bleach activators and/or bleach catalysts.

In a more preferred embodiment the washing agent according to the invention is a liquid textile washing agent.

In a further more preferred embodiment the washing agent according to the invention is a powdered color washing agent, in other words a powdered textile washing agent for colored textiles.

The washing and cleaning agents according to the invention can moreover contain other conventional constituents of washing and cleaning agents, in particular textile washing agents, selected in particular from the group of builders, surfactants, polymers, enzymes, disintegrating agents, scents and perfume carriers.

The builders include in particular zeolites, silicates, carbonates, organic cobuilders and—provided there are no ecological prejudices against their use—phosphates.

The finely crystalline, synthetic zeolite containing bound water is preferably zeolite A and/or zeolite P. One example of a suitable zeolite P is zeolite MAP® (a commercial product from Crosfield). Zeolite X and mixtures of zeolite A, X and/or P are also suitable, however. A co-crystallisate of zeolite X and zeolite A (approx. 80 wt. % zeolite X), for example, which can be described by the formula $$n\,Na_2O.(1\text{-}n)K_2O.Al_2O_3.(2\text{-}2.5)SiO_2.(3.5\text{-}5.5)H_2O$$

is commercially available and can be used in the context of the present invention. The zeolite can be used both as a builder in a granular compound and also to achieve a type of "powdering" of a granular mixture, preferably of a compressible mixture, wherein both methods of incorporating the zeolite into the pre-mixture are conventionally used. Zeolites can have an average particle size of less than 10 μm (volume distribution; measurement method: Coulter counter) and preferably contain 18 wt. % to 22 wt. %, in particular 20 wt. % to 22 wt. %, of bound water.

Crystalline layered silicates of the general formula $NaMSi_xO_{2x-1}.y\,H_2O$ can also be used, in which M denotes sodium or hydrogen, x is a number from 1.9 to 22, preferably from 1.9 to 4, more preferred values for x being 2, 3 or 4, and y denotes a number from 0 to 33, preferably from 0 to 20. The crystalline layered silicates of the formula $NaMSi_xO_{2x+1}.y\,H_2O$ are sold for example by Clariant GmbH (Germany) under the trade name Na-SKS. Examples of these silicates are Na-SKS-1 ($Na_2Si_{22}O_{45}.x\,H_2O$, kenyaite), Na-SKS-2 ($Na_2Si_{14}O_{29}.x\,H_2O$, magadiite), Na-SKS-3 ($Na_2Si_8O_{17}.x\,H_2O$) or Na-SKS-4 ($Na_2Si_4O_9.x\,H_2O$, makatite).

Crystalline phyllosilicates of the formula $NaMSi_xO_{2x+1}.y\,H_2O$ in which x denotes 2 are preferred. In particular, both β- and δ-sodium disilicates $Na_2Si_2O_5.y\,H_2O$ and moreover above all Na-SKS-5 (α-$Na_2Si_2O_5$), Na-SKS-7 (β-$Na_2Si_2O_5$, natrosilite), Na-SKS-9 ($NaHSi_2O_5.H_2O$), Na-SKS-10 ($NaHSi_2O_5.3\,H_2O$, kanemite), Na-SKS-11 (t-$Na_2Si_2O_5$) and Na-SKS-13 ($NaHSi_2O_5$) are suitable, but in particular Na-SKS-6 (δ-$Na_2Si_2O_5$). Washing or cleaning agents preferably contain a proportion by weight of the crystalline layered silicate of the formula $NaMSi_xO_{2x+1}.y\,H_2O$ from 0.1 wt. % to 20 wt. %, preferably from 0.2 wt. % to 15 wt. % and in particular from 0.4 wt. % to 10 wt. %.

Amorphous sodium silicates having an $Na_2O:SiO_2$ modulus from 1:2 to 1:3.3, preferably from 1:2 to 1:2.8 and in particular from 1:2 to 1:2.6, which preferably have a delayed solubility and secondary washing properties, can also be used. The delayed solubility in comparison to conventional amorphous sodium silicates can be brought about in various ways, for example by surface treatment, compounding, compacting/compression or by overdrying. The term "amorphous" is understood to mean that in X-ray diffraction experiments the silicates do not yield sharp X-ray reflexes, as is typical of crystalline substances, but rather at most give rise to one or more maxima of the scattered X-ray radiation having a width of several degree units of the diffraction angle.

Alternatively or in combination with the aforementioned amorphous sodium silicates, X-ray-amorphous silicates can be used whose silicate particles yield intergrown or even sharp diffraction maxima in electron diffraction experiments. This should be interpreted to mean that the products have microcrystalline regions of ten to some hundred nm in size, with values of up to max. 50 nm and in particular up to max. 20 nm being preferred. Such X-ray-amorphous silicates likewise have a delayed solubility in comparison to the conventional water glasses. Compressed/compacted amorphous silicates, compounded amorphous silicates and overdried X-ray-amorphous silicates are preferred in particular.

If present, this (these) silicate(s), preferably alkali silicates, more preferably crystalline or amorphous alkali disilicates, are included in washing or cleaning agents in amounts from 3 wt. % to 60 wt. %, preferably from 8 wt. % to 50 wt. % and in particular from 20 wt. % to 40 wt. %.

A use of the generally known phosphates as builder substances is also possible, provided that such a use is not to be avoided on ecological grounds. Of the many commercially available phosphates, the alkali metal phosphates, with particular preference for pentasodium or pentapotassium triphosphate (sodium or potassium tripolyphosphate), have the greatest significance in the washing and cleaning agents industry.

Alkali metal phosphates is the summary term for the alkali metal (in particular sodium and potassium) salts of the various phosphoric acids, among which it is possible to differentiate between metaphosphoric acids $(HPO_3)_n$ and orthophosphoric acids $H_3PO_4$ and higher-molecular-weight representatives. The phosphates combine several advantages: they act as alkali carriers, prevent limescale deposits on machine parts or limescale encrustations in fabrics and in addition contribute to the cleaning performance. Particularly important phosphates in industry are pentasodium triphosphate, $Na_5P_3O_{10}$ (sodium tripolyphosphate) and the corresponding potassium salt pentapotassium triphosphate, $K_5P_3O_{10}$ (potassium tripolyphosphate). Sodium potassium tripolyphosphates are also preferably used. If phosphates are used in washing or cleaning agents, preferred agents contain this (these) phosphate(s), preferably alkali metal phosphate(s), more preferably pentasodium or pentapotassium triphosphate (sodium or potassium tripolyphosphate), in amounts from 5 wt. % to 80 wt. %, preferably from 15 wt. % to 75 wt. % and in particular from 20 wt. % to 70 wt. %.

Alkali carriers can also be used. Alkali carriers include for example alkali metal hydroxides, alkali metal carbonates, alkali metal hydrogen carbonates, alkali metal sesquicarbonates, the cited alkali silicates, alkali metasilicates and mixtures of the aforementioned substances, with alkali carbonates, in particular sodium carbonate, sodium hydrogen carbonate or sodium sesquicarbonate, preferably being used. A builder system containing a mixture of tripolyphosphate and sodium carbonate can be more preferred. Owing to their low chemical compatibility with the other ingredients of washing or cleaning agents in comparison to other builder substances, the alkali metal hydroxides are conventionally used in only small amounts, preferably in amounts below 10 wt. %, preferably below 6 wt. %, more preferably below 4 wt. % and in particular below 2 wt. %. Agents containing relative to their total weight less than 0.5 wt. % and in particular no alkali metal hydroxides are more preferred. The use of carbonate(s) and/or hydrogen carbonate(s), preferably alkali carbonate(s), more preferably sodium carbonate, in amounts from 2 wt. % to 50 wt. %, preferably from 5 wt. % to 40 wt. % and in particular from 7.5 wt. % to 30 wt. %, is preferred.

Polycarboxylates/polycarboxylic acids, polymeric polycarboxylates, aspartic acid, polyacetals, dextrins and phosphonates can be mentioned in particular as organic cobuilders. The polycarboxylic acids, which can be used in the form of the free acid and/or its sodium salts, polycarboxylic acids being understood to be those carboxylic acids carrying more than one acid function, can be used for example. These are for example citric acid, adipic acid, succinic acid, glutaric acid, malic acid, tartaric acid, maleic acid, fumaric acid, sugar acids, aminocarboxylic acids, nitrilotriacetic acid (NTA), provided that such a use is not to be opposed on ecological grounds, and mixtures thereof. In addition to their builder action, the free acids typically also have the characteristic of an acidifying component and are thus also used to establish a lower and milder pH in washing or cleaning agents. Citric acid, succinic acid, glutaric acid, adipic acid, gluconic acid and any mixtures thereof are to be cited here in particular. Also suitable as builders are polymeric polycarboxylates, such as for example the alkali metal salts of polyacrylic acid or polymethacrylic acid, for example those having a relative molar mass from 500 g/mol to 70,000 g/mol. Polyacrylates, which preferably have a molar mass from 2000 g/mol to 20,000 g/mol, are suitable in particular. Of this group, owing to their superior solubility, preference can in turn be given to the short-chain polyacrylates having molar masses from 2000 g/mol to 10,000 g/mol and more preferably from 3000 g/mol to 5000 g/mol. Also suitable are copolymeric polycarboxylates, in particular those of acrylic acid with methacrylic acid and of acrylic acid or methacrylic acid with maleic acid. Copolymers of acrylic acid with maleic acid containing 50 wt. % to 90 wt. % of acrylic acid and 50 wt. % to 10 wt. % of maleic acid have proved to be particularly suitable. Their relative molar mass, relative to free acids, is generally 2000 g/mol to 70,000 g/mol, preferably 20,000 g/mol to 50,000 g/mol and in particular 30,000 g/mol to 40,000 g/mol. To improve their solubility in water the polymers can also contain allyl sulfonic acids, such as for example allyloxybenzenesulfonic acid and methallyl sulfonic acid, as monomers. The (co)polymeric polycarboxylates can be used as a solid or in aqueous solution. The content of (co)polymeric polycarboxylates in washing or cleaning agents is preferably 0.5 wt. % to 20 wt. % and in particular 3 wt. % to 10 wt. %.

Biodegradable polymers consisting of more than two different monomer units are also preferred in particular, for example those containing as monomers salts of acrylic acid and maleic acid and vinyl alcohol or vinyl alcohol derivatives or those containing as monomers salts of acrylic acid and 2-alkyl allyl sulfonic acid and sugar derivatives. Further preferred copolymers are those having acrolein and acrylic acid/acrylic acid salts or acrolein and vinyl acetate as monomers. Also to be mentioned as further preferred builder substances are polymeric amino dicarboxylic acids, the salts thereof or the precursor substances thereof. Polyaspartic acids or salts thereof are more preferred.

Further suitable builder substances are polyacetals, which can be obtained by reacting dialdehydes with polyol carboxylic acids having 5 to 7 C atoms and at least 3 hydroxyl groups. Preferred polyacetals are obtained from dialdehydes such as glyoxal, glutaraldehyde, terephthalaldehyde and mixtures thereof and from polyol carboxylic acids such as gluconic acid and/or glucoheptonic acid.

Further suitable organic builder substances are dextrins, for example oligomers or polymers of carbohydrates, which can be obtained by partial hydrolysis of starches. The hydrolysis can be performed by conventional methods, for example acid- or enzyme-catalyzed methods. The hydrolysis products preferably have average molar masses in the range from 400 g/mol to 500,000 g/mol. A polysaccharide having a dextrose equivalent (DE) in the range from 0.5 to 40, in particular from 2 to 30, is preferred, wherein DE is a commonly used measure for the reducing action of a polysaccharide in comparison to dextrose, which has a DE of 100. Both maltodextrins having a DE of between 3 and 20 and dry glucose syrups having a DE of between 20 and 37 and also yellow dextrins and white dextrins having elevated molar masses in the range from 2000 g/mol to 30,000 g/mol can be used. The oxidized derivatives of such dextrins are their reaction products with oxidizing agents which are capable of oxidizing at least one alcohol function of the saccharide ring to the carboxylic acid function.

Oxydisuccinates and other derivatives of disuccinates, preferably ethylenediamine disuccinate, are further additional suitable cobuilders. Ethylenediamine-N,N'-disuccinate (EDDS) is preferably used here in the form of its sodium or magnesium salts. Also preferred in this context are glycerol disuccinates and glycerol trisuccinates. If desired, suitable amounts to be used, in particular in formulations containing zeolites and/or silicates, are 3 wt. % to 15 wt. %.

Further organic cobuilders which can be used are for example acetylated hydroxycarboxylic acids or salts thereof which can optionally also be present in the lactone form and which contain at least four carbon atoms and at least one hydroxyl group as well as a maximum of two acid groups.

Furthermore, all compounds which are capable of forming complexes with alkaline-earth ions can be used as builders.

Washing and cleaning agents can contain non-ionic, anionic, cationic and/or amphoteric surfactants.

All non-ionic surfactants known to the person skilled in the art can be used as non-ionic surfactants. Washing or cleaning agents contain to particular advantage non-ionic surfactants from the group of alkoxylated alcohols. Alkoxylated, advantageously ethoxylated, in particular primary alcohols having preferably 8 to 18 C atoms and on average 1 to 12 mol of ethylene oxide (EU) per mol of alcohol are preferably used as non-ionic surfactants, in which the alcohol residue can be linear or preferably methyl-branched in the 2-position or can contain linear and methyl-branched residues in the mixture, such as are conventionally present in oxoalcohol residues. However, alcohol ethoxylates having linear residues obtained from alcohols of native origin having 12 to 18 C atoms, for example from coconut, palm, tallow or oleyl alcohol, and on average 2 to 8 mol of EU per mol of alcohol are preferred in particular. The preferred ethoxylated alcohols include, for example, $C_{12-14}$ alcohols having 3 EO or 4 EO, $C_{9-11}$ alcohol having 7 EO, $C_{13-15}$ alcohols having 3 EO, 5 EO, 7 EO or 8 EU, $C_{12-18}$ alcohols having 3 EO, 5 EO or 7 EO and mixtures thereof, such as mixtures of $C_{12-14}$ alcohol having 3 EU and $C_{12-18}$ alcohol having 5 EO. The specified degrees of ethoxylation are statistical averages which for an individual product can correspond to a whole number or a fraction. Preferred alcohol ethoxylates have a narrow homolog distribution (narrow-range ethoxylates, NRE).

Alternatively or in addition to these non-ionic surfactants, fatty alcohols having more than 12 EO can also be used. Examples thereof are tallow fatty alcohol having 14 EU, 25 EU, 30 EO or 40 Ea Alkyl glycosides of the general formula $RO(G)_x$ can moreover be used as further non-ionic surfactants, in which R corresponds to a primary straight-chain or methyl-branched aliphatic residue, in particular one methyl-branched in the 2-position, having 8 to 22, preferably 12 to 18 C atoms, and G is the symbol denoting a glycose unit having 5 or 6 C atoms, preferably glucose. The degree of oligomerization x, which indicates the distribution of monoglycosides and oligoglycosides, is any number between 1 and 10; x is preferably 1.2 to 1.4.

Another class of preferably used non-ionic surfactants, which are used either as the only non-ionic surfactant or in combination with other non-ionic surfactants, is alkoxylated, preferably ethoxylated or ethoxylated and propoxylated, fatty acid alkyl esters, preferably having 1 to 4 carbon atoms in the alkyl chain.

Non-ionic surfactants of the amine oxide type, for example N-cocoalkyl-N,N-dimethyl amine oxide and N-tallow alkyl-N,N-dihydroxyethyl amine oxide, and of the fatty acid alkanol amide type can also be used. The amount of these non-ionic surfactants is preferably no more than that of the ethoxylated fatty alcohols, in particular no more than half that.

Further suitable surfactants are polyhydroxy fatty acid amides of the formula

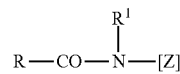

II in which R denotes an aliphatic acyl residue having 6 to 22 carbon atoms, $R^1$ denotes hydrogen, an alkyl or hydroxyalkyl residue having 1 to 4 carbon atoms and [Z] denotes a linear or branched polyhydroxyalkyl residue having 3 to 10 carbon atoms and 3 to 10 hydroxyl groups. The polyhydroxy fatty acid amides are known substances which can conventionally be obtained by reductive amination of a reducing sugar with ammonia, an alkyl amine or an alkanol amine and subsequent acylation with a fatty acid, a fatty acid alkyl ester or a fatty acid chloride. The group of polyhydroxy fatty acid amides also includes compounds of the formula

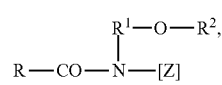

III in which R denotes a linear or branched alkyl or alkenyl residue having 7 to 12 carbon atoms, $R^1$ denotes a linear, branched or cyclic alkyl residue or an aryl residue having 2 to 8 carbon atoms and $R^2$ denotes a linear, branched or cyclic alkyl residue or an aryl residue or an oxyalkyl residue having 1 to 8 carbon atoms, $C_{1-4}$ alkyl or phenyl residues being preferred, and [Z] denotes a linear polyhydroxyalkyl residue, whose alkyl chain is substituted with at least two hydroxyl groups, or alkoxylated, preferably ethoxylated or propoxylated derivatives of this residue. [Z] is preferably obtained by reductive amination of a reduced sugar, for example glucose, fructose, maltose, lactose, galactose, mannose or xylose. The N-alkoxy- or N-aryloxy-substituted compounds can be converted into the desired polyhydroxy fatty acid amides by reaction with fatty acid methyl esters in the presence of an alkoxide as catalyst.

Non-ionic surfactants from the group of alkoxylated alcohols, more preferably from the group of mixed alkoxylated alcohols and in particular from the group of EO/AO/EO non-ionic surfactants, or PO/AO/PO non-ionic surfactants, especially PO/EO/PO non-ionic surfactants, are more preferred in cleaning agents. Such PO/EO/PO non-ionic surfactants are characterized by good foam control.

Surfactants of the sulfonate and sulfate type for example are used as anionic surfactants. Suitable surfactants of the sulfonate type are preferably $C_{9-13}$ alkylbenzene sulfonates, olefin sulfonates, i.e. mixtures of alkene and hydroxyalkane sulfonates, and disulfonates, such as are obtained for example from $C_{12-18}$ monoolefins having a terminal or internal double bond by sulfonation with gaseous sulfur trioxide and subsequent alkaline or acid hydrolysis of the sulfonation products. Also suitable are alkane sulfonates obtained from $C_{12-18}$ alkanes, for example by sulfochlorination or sulfoxidation with subsequent hydrolysis or neutralization. Likewise suitable are the esters of α-sulfo fatty acids (ester sulfonates), for example the α-sulfonated methyl esters of hydrogenated coconut, palm kernel or tallow fatty acids.

Further suitable anionic surfactants are sulfonated fatty acid glycerol esters. Fatty acid glycerol esters are understood to be the mono-, di- and triesters and mixtures thereof, such as are obtained in the production by esterification of a monoglycerol with 1 to 3 mol of fatty acid or in the interesterification of triglycerides with 0.3 to 2 mol of glycerol. Preferred sulfonated fatty acid glycerol esters are the sulfonation products of saturated fatty acids having 6 to 22 carbon atoms, for example of hexanoic acid, octanoic acid, decanoic acid, myristic acid, lauric acid, palmitic acid, stearic acid or docosanoic acid.

The alkali and in particular the sodium salts of the sulfuric acid semi-esters of $C_{12}$-$C_{18}$ fatty alcohols, for example of coconut fatty alcohol, tallow fatty alcohol, lauryl, myristyl, cetyl or stearyl alcohol, or of $C_{10}$-$C_{20}$ oxoalcohols and the semi-esters of secondary alcohols of those chain lengths are preferred as alk(en)yl sulfates. Also preferred are alk(en)yl sulfates of the specified chain length containing a synthetic, straight-chain alkyl residue produced on a petrochemical basis, which have an analogous degradation behavior to the appropriate compounds based on fat chemistry raw materials. From a detergent perspective the $C_{12}$-$C_{16}$ alkyl sulfates and $C_{12}$-$C_{15}$ alkyl sulfates and $C_{14}$-$C_{15}$ alkyl sulfates are preferred. 2,3-Alkyl sulfates, which can be obtained as commercial products from the Shell Oil Company under the name DAN®, are also suitable anionic surfactants.

The sulfuric acid monoesters of the straight-chain or branched $C_{7-21}$ alcohols ethoxylated with 1 to 6 mol of ethylene oxide, such as 2-methyl-branched $C_{9-11}$ alcohols having on average 3.5 mol of ethylene oxide (EO) or $C_{12-18}$ fatty alcohols having 1 to 4 EO, are also suitable. Owing to their high foaming characteristics they are used in cleaning agents in only relatively small amounts, for example in amounts from 1 wt. % to 5 wt. %.

Further suitable anionic surfactants are also the salts of alkyl sulfosuccinic acid, which are also known as sulfosuccinates or sulfosuccinic acid esters, and the monoesters and/or diesters of sulfosuccinic acid with alcohols, preferably fatty alcohols and in particular ethoxylated fatty alcohols. Preferred sulfosuccinates contain $C_{8-18}$ fatty alcohol residues or mixtures thereof. Sulfosuccinates that are preferred in particular contain a fatty alcohol residue derived from ethoxylated fatty alcohols which are non-ionic surfactants in their own right. In turn, sulfosuccinates whose fatty alcohol residues derive from ethoxylated fatty alcohols having a narrow homolog distribution are more preferred. It is likewise also possible to use alk(en)yl succinic acid having preferably 8 to 18 carbon atoms in the alk(en)yl chain or salts thereof.

Further suitable anionic surfactants are in particular soaps. Saturated fatty acid soaps are suitable, such as the salts of lauric acid, myristic acid, palmitic acid, stearic acid, hydrogenated erucic acid and docosanoic acid, and in particular soap mixtures derived from natural fatty acids, for example coconut, palm kernel or tallow fatty acids.

The anionic surfactants including the soaps can be present in the form of their sodium, potassium or ammonium salts and as soluble salts of organic bases, such as mono-, di- or triethanolamine. The anionic surfactants are preferably in the form of their sodium or potassium salts, in particular in the form of their sodium salts.

Cationic and/or amphoteric surfactants can also be used in place of or in conjunction with the specified surfactants.

For example, cationic compounds of the following formulae can be used as cationic active substances:

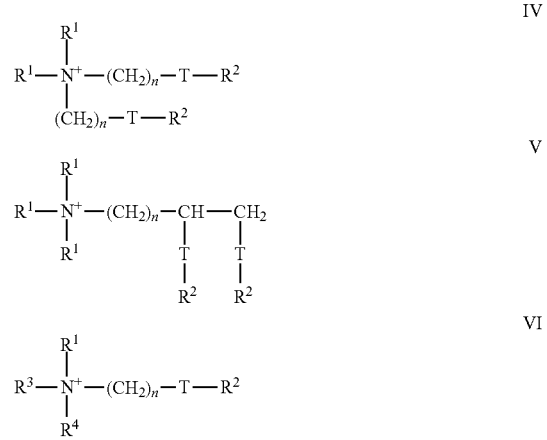

in which each $R^1$ group is selected independently of one another from $C_{1-6}$ alkyl, alkenyl or hydroxyalkyl groups, each $R^2$ group is selected independently of one another from $C_{8-28}$ alkyl or alkenyl groups; $R^3=R^1$ or $(CH_2)_n$-T-$R^2$; $R^4=R^1$ or $R^2$ or $(CH_2)_n$-T-$R^2$; T=—$CH_2$—, —O—CO— or —CO—O— and n is a whole number from 0 to 5.

Textile-softening compounds can be used to care for the textiles and to improve textile properties such as a softer "touch" (finishing) and reduced electrostatic charge (increased wear comfort). The active ingredients of these formulations are quaternary ammonium compounds having two hydrophobic residues, such as for example distearyl dimethyl ammonium chloride, which, however, because of its unsatisfactory biodegradability is increasingly being replaced by quaternary ammonium compounds containing in their hydrophobic residues ester groups as predetermined breaking points for biodegradation.

Such esterquats having improved biodegradability are obtainable for example by esterifying mixtures of methyl diethanolamine and/or triethanolamine with fatty acids and then quaternizing the reaction products in a manner known per se with alkylating agents. Dimethylol ethylene urea is also suitable as a finishing agent.

Enzymes can be used to increase the washing or cleaning performance of washing or cleaning agents. These include in particular proteases, amylases, lipases, hemicellulases, cellulases, perhydrolases or oxidoreductases, and preferably mixtures thereof. These enzymes are of natural origin in principle; starting from the natural molecules, improved variants are available for use in washing and cleaning agents which accordingly are preferably used. Washing or cleaning agents preferably contain enzymes in total amounts of $1 \times 10^{-6}$ wt. % to 5 wt. %, relative to active protein. The protein concentration can be determined with the aid of known methods, for example the BCA method or the Biuret method.

Of the proteases, those of the subtilisin type are preferred. Examples thereof are the subtilisins BPN' and Carlsberg and the developed forms thereof, the protease PB92, the subtilisins 147 and 309, the alkaline protease from *Bacillus lentus*, subtilisin DY, and the enzymes thermitase, proteinase K and the proteases TW3 and TW7, which can be assigned to the subtilases but no longer in the narrower sense to the subtilisins.

Examples of amylases which can be used according to the invention are the α-amylases from *Bacillus licheniformis*, from *B. amyloliquefaciens*, from *B. stearothermophilus*, from *Aspergillus niger* and *A. oryzae*, and the further developments of the aforementioned amylases improved for use in washing and cleaning agents. Furthermore, the α-amylase from *Bacillus* sp. A 7-7 (DSM 12368) and the cyclodextrin glucanotransferase (CGTase) from *B. agaradherens* (DSM 9948) can be mentioned for this purpose.

Lipases or cutinases can be used because of their triglyceride-cleaving activity. These include for example the lipases obtainable originally from *Humicola lanuginosa* (*Thermomyces lanuginosus*) or the further developments thereof, in particular those with the amino acid exchange D96L. Furthermore, the cutinases that were originally isolated from *Fusarium solani* pisi and *Humicola insolens* can also be used, for example. Lipases or cutinases whose starting enzymes were originally isolated from *Pseudomonas mendocina* and *Fusarium solanii* can also be used.

Enzymes which are grouped together under the term hemicellulases can moreover be used. They include for example mannanases, xanthan lyases, pectin lyases (=pectinases), pectinesterases, pectate lyases, xyloglucanases (=xylanases), pullulanases and β-glucanases.

To increase the bleaching action, oxidoreductases, for example oxidases, oxygenases, catalases, peroxidases, such as halo-, chloro-, bromo-, lignin, glucose or manganese peroxidases, dioxygenases or laccases (phenoloxidases, polyphenoloxidases) can be used if desired. Preferably organic, more preferably aromatic compounds which interact with the enzymes are advantageously additionally added to strengthen the activity of the oxidoreductases concerned (enhancers) or to ensure the flow of electrons in the case of very differing redox potentials between the oxidizing enzymes and the stains (mediators).

The enzymes can be used in any form established according to the prior art. These include for example the solid preparations obtained by granulation, extrusion or lyophilization or, particularly in the case of agents in liquid or gel form, solutions of the enzymes, advantageously as concentrated as possible, with a low water content and/or mixed with stabilizers. For both the solid and the liquid presentation form, the enzymes can alternatively be encapsulated, for example by spray drying or extrusion of the enzyme solution together with a preferably natural polymer, or in the form of capsules, for example those in which the enzymes are enclosed as in a solidified gel or in those of the core-shell type, in which an enzyme-containing core is coated with a protective layer which is impermeable to water, air and/or chemicals. Further active ingredients, for example stabilizers, emulsifiers, pigments, bleaches or dyes, can additionally be applied in superimposed layers. Such capsules are applied by methods known per se, for example by vibrating or roll granulation or in fluidized-bed processes. Such granules are advantageously low in dust, for example through the application of polymeric film formers, and stable in storage because of the coating. It is also possible to make up two or more enzymes together so that a single granulated product has multiple enzyme activities.

One or more enzymes and/or enzyme preparations, preferably solid protease preparations and/or amylase preparations, are preferably used in amounts from 0.1 wt. % to 5 wt. %, preferably from 0.2 wt. % to 4.5 wt. % and in particular from 0.4 wt. % to 4 wt. %.

Individual fragrance compounds, for example synthetic products of the ester, ether, aldehyde, ketone, alcohol and hydrocarbon type, can be used as perfume oils or scents. Mixtures of different fragrances which together generate an attractive scent note are preferably used, however. Such perfume oils can also contain natural fragrance mixtures, such as are obtainable from plant sources, for example pine, citrus, jasmine, patchouli, rose or ylang-ylang oil. In order to be perceptible, a fragrance must be volatile, wherein in addition to the nature of the functional groups and the structure of the chemical compound, the molar mass also plays an important role. Thus most fragrances have molar masses of up to approx. 200 g/mol, whereas molar masses of 300 g/mol and above constitute an exception. Owing to the differing volatility of fragrances, the odor of a perfume or scent composed of a plurality of fragrances changes as it evaporates, wherein the odor impressions are divided into "top note", "middle note" or "body", and "end note" or "dry-out". As the odor perception is also based to a great extent on the odor intensity, the top note of a perfume or scent does not consist solely of highly volatile compounds, whereas the end note consists largely of less volatile, i.e. fixative, fragrances. When composing perfumes, more highly volatile fragrances can be bound for example to certain fixatives, thus preventing their too rapid evaporation. Thus the following categorization of fragrances into "more highly volatile" or "fixative" fragrances says nothing about the odor impression or whether the corresponding fragrance is perceived as a top note or middle note. The scents can be processed directly, but it can also be advantageous to apply the scents to carriers, which through a slower release of the scent ensure a long-lasting scent. Cyclodextrins for example have proved effective as such carrier materials, wherein the cyclodextrin perfume complexes can also additionally be layered with further auxiliary agents.

In choosing the coloring agent it is important to ensure that the coloring agents can have a high storage stability and photostability and not too strong an affinity to textile surfaces and in particular to synthetic fibers. At the same time it must also be borne in mind that coloring agents can exhibit differing levels of oxidation stability. Generally speaking, non-water-soluble coloring agents have a greater oxidation stability than water-soluble coloring agents. The concentration of the coloring agent in the washing or cleaning agents varies, depending on the solubility and hence also on the oxidation sensitivity. In the case of readily water-soluble coloring agents, coloring agent concentrations in the range from a few $10^{-2}$ wt. % to $10^{-3}$ wt. % are typically chosen. By contrast, in the case of pigment dyes which are preferred in particular because of their brilliance but which are less readily water-soluble, the suitable concentration of the coloring agent in washing or cleaning agents is typically a few $10^{-3}$ wt. % to $10^{-4}$ wt. %. Coloring agents which can be broken down by oxidation in the washing process and mixtures thereof with suitable blue dyes known as blue toners are preferred. It has proved advantageous to use coloring agents that are soluble in water or at room temperature in liquid organic substances. For example, anionic coloring agents, e.g. anionic nitroso dyes, are suitable.

In addition to the hitherto cited components, the washing or cleaning agents can contain further ingredients which further improve the applicational and/or aesthetic properties of said agents. Preferred agents contain one or more substances from the group of electrolytes, pH adjusters, fluorescent agents, hydrotropes, foam inhibitors, silicone oils, anti-redeposition agents, optical brighteners, graying inhibitors, anti-shrink agents, anti-crease agents, dye transfer inhibitors, antimicrobial active ingredients, germicides, fungicides, antioxidants, antistatics, ironing aids, phobing and impregnating agents, non-swelling and anti-slip agents and UV absorbers.

A large number of the most diverse salts can be used as electrolytes from the group of inorganic salts. Preferred cations are the alkali and alkaline-earth metals, while preferred anions are the halides and sulfates. From a manufacturing perspective the use of NaCl or $MgCl_2$ in the washing or cleaning agents is preferred.

The use of pH adjusters can be indicated in order to bring the pH of washing or cleaning agents into the desired range. All known acids or lyes can be used here, provided that their use is not prohibited on applicational or ecological grounds or for reasons of consumer protection. The amount of these adjusters does not usually exceed 1 wt. % of the total formulation.

Soaps, oils, fats, paraffins or silicone oils, which can optionally be applied to carrier materials, are suitable as foam inhibitors. Inorganic salts such as carbonates or sulfates, cellulose derivatives or silicates and mixtures of the aforementioned materials, for example, are suitable as carrier materials. In the context of the present application preferred agents contain paraffins, preferably unbranched paraffins (n-paraffins) and/or silicones, preferably linear-polymer silicones, which are structured in accordance with the scheme $(R_2SiO)_x$ and are also known as silicone oils. These silicone oils are usually clear, colorless, neutral, odor-free, hydrophobic liquids having a molecular weight of between 1000 g/mol and 150,000 g/mol and viscosities of between 10 mPa·s and 1,000,000 mPa·s.

Suitable anti-redeposition agents are for example non-ionic cellulose ethers such as methyl cellulose and methyl hydroxypropyl cellulose having a methoxy group content of 15 to 30 wt. % and a hydroxypropyl group content of 1 to 15 wt. %, relative in each case to the non-ionic cellulose ethers.

The polymers of phthalic acid and/or terephthalic acid and derivatives thereof, in particular polymers of ethylene terephthalate and/or polyethylene glycol terephthalate, or anionically and/or non-ionically modified derivatives thereof, known from the prior art are suitable as soil repellents. Of those, the sulfonated derivatives of phthalic acid and terephthalic acid polymers are preferred in particular.

Optical brighteners can be added to washing agents in particular to eliminate graying and yellowing of the treated textiles. These substances attach to the fibers and bring about a brightening and simulated bleaching effect by converting invisible ultraviolet radiation into visible light of a longer wavelength, wherein the ultraviolet light absorbed from sunlight is radiated as a weakly bluish fluorescence and forms pure white with the yellow tone of grayed or yellowed laundry. Suitable compounds are derived for example from the substance classes of 4,4'-diamino-2,2'-stilbene disulfonic acids (flavonic acids), 4,4'-distyryl biphenylene, methylumbelliferones, coumarins, dihydroquinolinones, 1,3-diaryl pyrazolines, naphthalic acid imides, benzoxazole, benzisoxazole and benzimidazole systems and the pyrene derivatives substituted by heterocyclic compounds.

The role of graying inhibitors is to hold the dirt released by the fibers suspended in the liquor and thus to prevent the dirt from reattaching. Water-soluble colloids, mostly of an organic nature, are suitable for this purpose, for example the water-soluble salts of polymeric carboxylic acids, glue, gelatin, salts of ether sulfonic acids of starch or cellulose or salts of acid sulfuric acid esters of cellulose or starch. Water-soluble polyamides containing acid groups are also suitable for this purpose. Soluble starch preparations can moreover be used, for example degraded starch, aldehyde starches, etc. Polyvinylpyrrolidone can also be used. Furthermore, cellulose ethers such as carboxymethyl cellulose (Na salt), methyl cellulose, hydroxyalkyl cellulose and mixed ethers such as methyl hydroxyethyl cellulose, methyl hydroxypropyl cellulose, methyl carboxymethyl cellulose and mixtures thereof can be used as graying inhibitors.

As textile fabrics, in particular those made from rayon, spun rayon, cotton and mixtures thereof, can tend to crease, because the individual fibers are susceptible to being bent, buckled, pressed and crushed at right angles to the fiber direction, synthetic anti-crease agents can be used. These include for example synthetic products based on fatty acids, fatty acid esters, fatty acid amides, fatty alkylol esters, fatty alkylol amides or fatty alcohols, which are mostly reacted with ethylene oxide, or products based on lecithin or modified phosphoric acid esters.

Phobing and impregnating methods serve to treat textiles with substances which prevent dirt from being deposited or make it easier to wash out. Preferred phobing and impregnating agents are perfluorinated fatty acids, also in the form of the aluminum and zirconium salts thereof, organic silicates, silicones, polyacrylic acid esters with a perfluorinated alcohol component or polymerizable compounds coupled with a perfluorinated acyl or sulfonyl residue. Antistatics can also be included. The dirt-repellent treatment with phobing and impregnating agents is often classed as an easy-care treatment. The penetration of the impregnating agents in the form of solutions or emulsions of the corresponding active ingredients can be facilitated by adding wetting agents, which reduce the surface tension. A further area of use of phobing and impregnating agents is the water-repellent treatment of textile goods, tents, tarpaulins, leather, etc., in which, in contrast to waterproofing, the fabric pores are not closed and so the material remains breathable (hydrophobing). The hydrophobing agents used for hydrophobing coat textiles, leather, paper, wood, etc. with a very thin layer of hydrophobic groups, such as relatively long alkyl chains or siloxane groups. Suitable hydrophobing agents are for example paraffins, waxes, metal soaps, etc., with additions of aluminum or zirconium salts, quaternary ammonium compounds having long-chain alkyl residues, urea derivatives, fatty acid-modified melamine resins, chromium complex salts, silicones, organotin compounds and glutardialdehyde as well as perfluorinated compounds. The hydrophobed materials do not feel greasy, but—as on greased materials—water droplets roll off them without wetting them. Thus silicone-impregnated textiles for example have a soft feel and are water- and dirt-repellent; marks from ink, wine, fruit juices and the like are easier to remove.

Antimicrobial active ingredients can be used to combat microorganisms. A distinction is made here between bacteriostatics and bactericides, fungistatics and fungicides, etc., depending on the antimicrobial spectrum and mechanism of action. Substances from these groups are, for example, benzalkonium chlorides, alkylaryl sulfonates, halogen phenols and phenol mercuriacetate, wherein these compounds can also be dispensed with entirely.

The agents can contain antioxidants to prevent undesirable changes to the washing and cleaning agents and/or to the treated textiles caused by exposure to atmospheric oxygen and by other oxidative processes. This class of compounds includes for example substituted phenols, hydroquinones, catechols and aromatic amines as well as organic sulfides, polysulfides, dithiocarbamates, phosphites and phosphonates.

An increased wear comfort can result from the additional use of antistatics. Antistatics increase the surface conductivity and thus allow an improved discharge of charges that are formed. External antistatics are generally substances having at least one hydrophilic molecule ligand and they form a more or less hygroscopic film on the surfaces. These mostly interfacially active antistatics can be subdivided into nitrogen-containing (amines, amides, quaternary ammonium compounds), phosphorus-containing (phosphoric acid esters) and sulfur-containing (alkyl sulfonates, alkyl sulfates) antistatics. Lauryl (or stearyl) dimethyl benzyl ammonium chlorides are likewise suitable as antistatics for textiles or as an addition to washing agents, with a finishing effect additionally being achieved.

Silicone derivatives can be used in textile washing agents to improve the water absorbency and the rewettability of the treated textiles and to make it easier to iron the treated textiles. Through their foam-inhibiting properties they additionally improve the rinsing behavior of washing or cleaning agents. Preferred silicone derivatives are for example polydialkyl or alkylaryl siloxanes in which the alkyl groups have one to five C atoms and are wholly or partially fluorinated. Preferred silicones are polydimethyl siloxanes, which can optionally be derivatized and are then amino-functional or quaternized or which have Si—OH, Si—H and/or Si—Cl bonds. Further preferred silicones are the polyalkylene oxide-modified polysiloxanes, in other words polysiloxanes, which for example contain polyethylene glycols, and the polyalkylene oxide-modified dimethyl polysiloxanes.

Finally, UV absorbers, which attach to the treated textiles and improve the light resistance of the fibers, can also be used. Compounds having these desired properties are for example the compounds and derivatives of benzophenone having substituents in the 2- and/or 4-position which act by non-radiative deactivation. Furthermore, substituted benzotriazoles, acrylates substituted with phenyl in the 3-position (cinnamic acid derivatives), optionally having cyano groups in the 2-position, salicylates, organic Ni complexes and natural substances such as umbelliferone and urocanic acid, which is produced naturally in the body, are also suitable.

Owing to their fiber-conditioning action, protein hydrolysates are further suitable active substances. Protein hydrolysates are mixtures of products which are obtained by acidically, basically or enzymatically catalyzed breakdown of proteins. Protein hydrolysates of both plant and animal origin can be used. Animal protein hydrolysates are for example elastin, collagen, keratin, silk and milk protein hydrolysates, which can also be present in the form of salts. The use of protein hydrolysates of plant origin, for example soy, almond, rice, pea, potato and wheat protein hydrolysates, is preferred. Although the use of protein hydrolysates as such is preferred, amino acid mixtures obtained by other means or individual amino acids such as for example arginine, lysine, histidine or pyroglutamic acid can optionally be used in their place. The use of derivatives of protein hydrolysates, for example in the form of their fatty acid condensation products, is likewise possible.

EXAMPLES

Example 1

Synthesis of poly(N-acryloyl-β-alanine-N'-methyl-hydroxamic acid)

Stage 1: Synthesis of N-acryloyl-β-alanine 48.6 ml of acryloyl chloride (0.6 mol) were added dropwise while stirring to a solution of 53.6 g of β-alanine (0.6 mol) in 100 ml of 12M NaOH, cooled to 0° C., in such a way that the temperature remained below 5° C. The solution was stirred for a further 30 minutes and then the pH was adjusted to 4.0 by the addition of approx. 40 g of concentrated HCl. Solids were removed from the solution by filtration. The pH of the filtrate was adjusted to 2.0 by the addition of concentrated HCl. After stirring for 2 hours at 0° C. the precipitate that was formed was filtered off and dried. Yield: 32 g of white crystals (0.22 mol, 37%).

$^1$H NMR (400 MHz, D$_2$O, δ in ppm): 6.3-6.15 (2H, CH$_2$—CH); 5.75 (1H, CH$_2$—CH); 3.55 (2H, NH—CH$_2$); 2.65 (2H, CH$_2$—COOH)

Stage 2: Synthesis of N-acryloyl-β-alanine benzotriazolide 29.5 g of benzotriazole (0.25 mol) and 32 g of N-acryloyl-β-alanine (0.22 mol) were dissolved in 900 ml of acetone in a round-bottom three-necked flask. The flask was immersed in an ice bath and 51.2 g of N,N'-dicyclohexylcarbodiimide (0.25 mol) were added to the solution. The solution was stirred overnight and then the precipitate of dicyclohexyl urea was removed by filtration. The solvent was removed on a rotary evaporator and the resulting solid was washed with petroleum ether and diethyl ether. Yield: 48 g of yellow crystals (0.2 mol, 91%).

$^1$H NMR (400 MHz, CD$_2$Cl$_2$, δ in ppm): 8.15-7.4 (4H, Ar); 6.2-6.0 (2H, CH$_2$—CH); 5.5 (1H, CH$_2$—CH); 3.8 (2H, NH—CH$_2$); 3.6 (2H, CH$_2$—CO)

Stage 3: Polymerization of N-acryloyl-β-alanine benzotriazolide 45 g of N-acryloyl-β-alanine benzotriazolide (0.184 mol) and 0.135 g of AIBN (0.82 mmol) were dissolved in 150 ml of dimethyl formamide in a round-bottom three-necked flask; the solution was degased under nitrogen by ultrasound. The temperature was increased to 60° C. After 20 hours a further 0.135 g of AIBN (0.82 mmol) dissolved in 1 ml of DMF were added and polymerization was performed for a further 24 hours. The polymer was not isolated but instead was used directly in stage 4.

Stage 4: Synthesis of poly(N-acryloyl-β-alanine-N'-methylhydroxamic acid)

45.2 g of methyl hydroxamic acid hydrochloride (0.54 mol) were dissolved in 400 ml of dimethyl formamide in a round-bottom three-necked flask. 75.4 ml of triethylamine (0.54 mol) were added dropwise and the solution was stirred at room temperature for 15 minutes. Then the precipitate of triethylamine hydrochloride was removed by filtration. The filtrate was added dropwise to the polymer solution obtained in stage 3 and the reaction mixture was stirred for 2 hours at room temperature. The solvent was removed on a rotary evaporator and the viscous polymer was precipitated out by adding acetone. The solid was dissolved twice in methanol and precipitated out each time by adding diethyl ether. Yield: 6.1 g of white crystals.

$^1$H NMR (400 MHz, D$_2$O/NaOD, δ in ppm): 3.6-3.3 (2H, NH—CH$_2$); 3.3-3.2 (3H, CH$_3$—NOH); 2.8-2.6 (2H, CH$_2$—CO); 2.3-1.3 (3H, CH$_2$—CH)

GPC (H$_2$O): =65,000 g/mol, PDI=1.3 (PEG standards)

Example 2

Cleaning Performance

Miniaturized washing tests were performed in triplicate at 40° C. on various red stains based on polyphenolic natural dyes (flavonoids). Extracts of red wine, red grape, blackcurrant, cherry and bilberry were used for the stains. The stains were produced manually by applying a constant amount of a dilute aqueous solution of the extracts to cotton fabric and then drying it. A bleach-free liquid washing agent was used for the washing tests, with which a washing liquor with a pH of 8.5 and consisting of 79 g of liquid washing agent and 1.6 g of the polymer produced in example 1 dissolved in 17 l of water of hardness 16° dH was prepared (see LWA polymer table below). For the purposes of comparison, an otherwise identical washing liquor containing only the liquid washing agent (LWA) was prepared. The tests were evaluated by measuring the color difference according to the L*a*b* values and the resulting Y values as a measure of the brightness. The table below shows the dY values obtained from the difference between Y (after washing) and Y (before washing).

TABLE 1

| Staining with extract of | dY (LWA) | dY (LWA + polymer) |
|---|---|---|
| Cherry | 24.1 | 29.8 |
| Red wine | 33.2 | 37.1 |
| Red grape | 35.4 | 39.7 |
| Blackcurrant | 33.2 | 37.7 |
| Bilberry | 29.1 | 31.3 |

The dY values with the addition of the polymer are greater than those obtained using only the liquid washing agent; this corresponds to a higher degree of whiteness and hence to an improved stain removal.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A washing or cleaning agent comprising builder, surfactant selected from the group consisting of non-ionic, anionic, cationic and amphoteric surfactants, and from 0.05 wt. % to 2 wt % polyamidohydroxamate having an average molar mass from 1000 g/mol to 100,000 g/mol; wherein the polyamidohydroxamate is obtained by radical polymerization of one of the monomers:

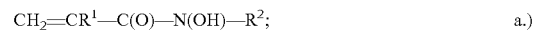

CH$_2$=CR$^1$—C(O)—N(OH)—R$^2$;  a.)

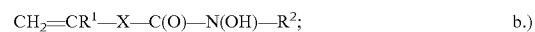

CH$_2$=CR$^1$—X—C(O)—N(OH)—R$^2$;  b.)

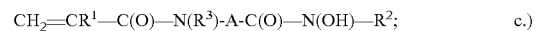

CH$_2$=CR$^1$—C(O)—N(R$^3$)-A-C(O)—N(OH)—R$^2$;  c.)

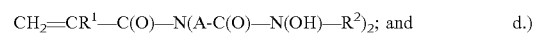

CH$_2$=CR$^1$—C(O)—N(A-C(O)—N(OH)—R$^2$)$_2$; and  d.)

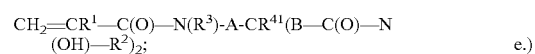

CH$_2$=CR$^1$—C(O)—N(R$^3$)-A-CR$^{41}$(B—C(O)—N(OH)—R$^2$)$_2$;  e.)

wherein R$^1$ denotes hydrogen or an alkyl group having 1 to 3 C atoms, R$^2$, R$^3$ and R$^4$ independently of one another denote hydrogen or an alkyl, aryl, alkylaryl or arylalkyl group having 1 to 20 C atoms, X denotes O-A, O—C(O)-A or C(O)—O-A and A and B independently of one another denote an alkylene group having 1 to 12 C atoms; and wherein the agent comprises no hydrogen peroxide, substances yielding hydrogen peroxide, bleach activators, and/or bleach catalysts;

and wherein the polyamidohydroxamate additionally contains further ethylenically unsaturated monomers having no amidohydroxamate functionality.

2. A method for treating fabric wherein the fabric is contacted with a liquid washing agent comprising polyamidohydroxamates.

* * * * *